July 20, 1965  H. H. COFFIN  3,195,374
METHOD OF MAKING AN ELECTRICALLY INSULATED JOINT
Original Filed Nov. 17, 1960

INVENTOR.
HARLAND H. COFFIN
BY
ATTORNEY

United States Patent Office 3,195,374
Patented July 20, 1965

3,195,374
METHOD OF MAKING AN ELECTRICALLY
INSULATED JOINT
Harland H. Coffin, Bridgeport, Conn., assignor to Producto Machine Company, Bridgeport, Conn., a corporation of Connecticut
Original application Nov. 17, 1960, Ser. No. 69,891. Divided and this application Apr. 3, 1963, Ser. No. 270,235
3 Claims. (Cl. 76—107)

The present invention relates to die sets, and particularly to a new and improved die set for use with apparatus such as electrical discharge machining apparatus, and the method of making same.

This application is a division of application Serial No. 69,891, filed November 17, 1960, in the name of Harland H. Coffin.

Electrical discharge machining apparatus has recently been employed with die set apparatus to produce costly dies for use in industry because the upper plate thereof can be moved toward the lower plate without any lateral deviation, which is an essential requirement in the process.

The production of dies with such apparatus requires the use of an electrode in the form of the cavity of the die to be produced that is usually fixed to the upper plate of the die set. The material from which the die is to be made is fixed to the lower plate of the die set. Since the process involves electronic apparatus capable of producing a voltage having between 75,000 to 300,000 cycles per second, the lower plate must be insulated from the upper plate.

Many attempts have been made in an effort to insulate these plates from each other with little practical success because a serious problem arises in maintaining the necessary accuracy between the guide pins and guide sleeves of the die set.

The principal object of the invention is to produce an electrically insulating joint between male and female members of a die set.

Another object of the invention is to produce such a joint in a die set so that the upper plate is insulated from the lower plate without detracting from the inherent accuracy of the die set.

Another object of the invention is to produce such a joint for a die set in which the insulating construction thereof does not prevent the die set from being used in punch press production runs.

Still another object of the invention is to produce such a joint for a die set in which the guide pin is insulated from the bottom plate.

Still another object of the invention is to produce such a joint for a die set in which the insulated pin construction can be used with existing as well as special die sets without alteration.

Another object of the invention is to provide such a joint for a die set in which any guide bushing may be employed.

A still further object of the invention is to provide such a joint for a die set in which the insulated pin construction will have the same rigidity and strength characteristics as prior known non-insulated pin construction.

In one aspect of the invention, a die set comprising a bottom plate may have guide pins pressed within holes extending therethrough. The pins may be of usual construction except at the lower end thereof where they may be of a reduced diameter.

In another aspect of the invention, a thin layer of bonding material such as molten molybdenum may be sprayed onto the reduced diameter portion.

In still another aspect of the invention, the end of the pin containing the bonding materail may be coated with a ceramic material such as aluminum oxide, aluminum oxide and titanium oxide, or zirconium oxide.

In still another aspect of the invention, the ceramic coated end of the guide pin may then be surrounded by a layer of metal such as pure molybdenum, 18–8 or type 316 stainless steel.

In still another aspect of the invention, the metal coated ceramic end may then be turned to a diameter which will make a press fit upon the end being inserted within a bore of a bottom plate of a die set.

The above, other objects and novel features of the invention will become apparent from the following specification and accompanying drawing which is merely exemplary.

Figure 1:
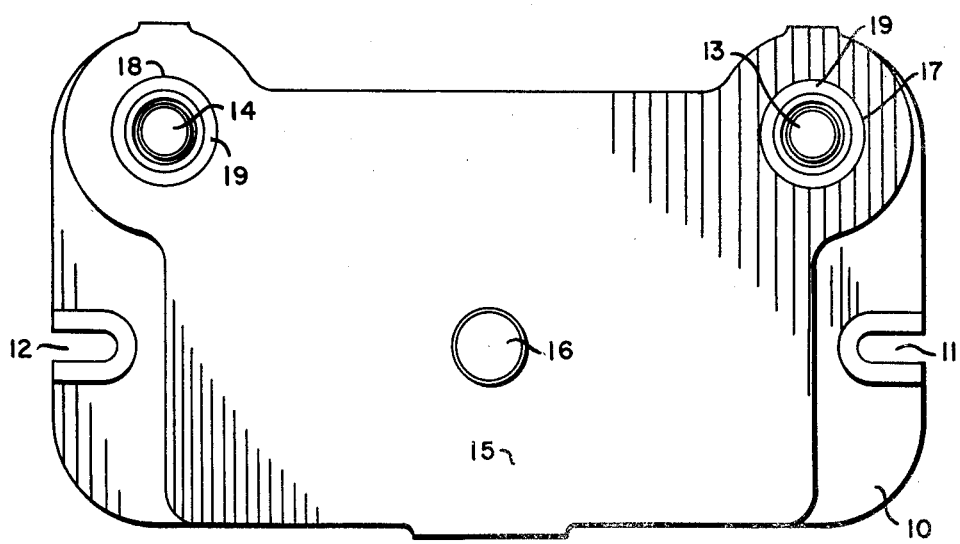
FIG. 1 is a top plan view of a die set to which the principles of the invention have been applied.
Figure 2:
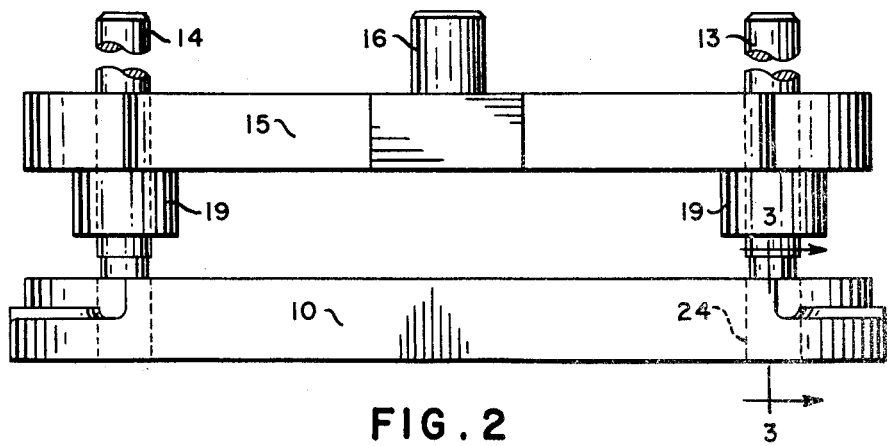
FIG. 2 is an elevational view of the die set shown in FIG. 1.

Referring to the drawing, the principles of the invention are shown as applied to a die set including a bottom plate 10 having slots 11 and 12 for receiving fastening means adapted rigidly to hold the bottom plate 10 to a supporting structure. Two or more case-hardnend studs 13 and 14 may be rigidly held in the plate 10 in parallel relation by a press fit within bores in plate 10.

An upper plate 15 may be provided with a stud 16 for engagement with a head member of the electrical discharge machining equipment that is adapted to be fed downwardly toward the bottom plate 10 at a predetermined feed rate. The upper plate 15 may include two or more bores 17 and 18 equal to the number of studs 13 and 14 and spaced so as to register therewith. Each bore 17 and 18 is adapted to have pressed therein a case-hardened sleeve 19 for guiding the upper plate 15 and for maintaining it parallel with bottom plate 10 at all times during its feeding movement.

The upper plate 15 may have fixed to its undersurface an electrode in the form of the internal cavity of a die to be formed, and material from which the die is to be made may be fixed to the bottom plate 10. As the plate 15 is fed downwardly, alternating voltage of between 75,000 and 300,000 cycles per second is provided across the die on plate 15 and the work on plate 10. This necessitates insulating plate 10 from plate 15.

Figure 3:
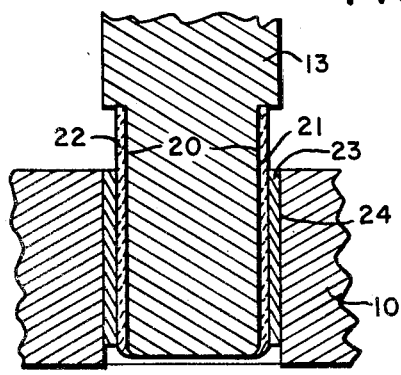
FIG. 3 is a sectional view taken substantially along line 3—3 of FIG. 2.

Referring to FIG. 3, this has been accomplished by reducing the diameter of pin 13 to a diameter 20. A thin layer 21 of bonding material may be applied to the reduced diameter portion of pin 13. This bonding material may be pure molybdenum. It may be applied by feeding a strip of metal through an acetylene flame at the end of spray gun in such fashion that molten metal is sprayed onto the reduced diameter portion of pin 13.

A ceramic coating 22 may then be applied to the bonding metal, and it may comprise aluminum oxide, aluminum oxide mixed with titanium oxide, or zirconium oxide. The ceramic oxide may be fed through an acetylene flame at the end of a spray gun which causes it to melt and be thrown on top of the bonding layer on the surface of the pin 13. It has been found that a sufficient thickness of ceramic should be applied to withstand a breakdown voltage of about 700 volts, thereby providing an adequate safety factor in the operation of electrical discharge machining apparatus.

A layer of metal 23 such as pure molybdenum, 18-8 or type 316 stainless steel may surround the ceramic layer. This metal may also be sprayed onto the ceramic coated end by feeding a strip of the metal into an acetylene flame at the end of a spray gun. Although the metal sleeve 23 has been described as having been sprayed on, such being the preferred method, it could, of course, be cast or otherwise formed and be applied by shrinking or by other methods.

The pin 13 may then be machined to a predetermined diameter and finally pressed into a bore 24 of the bottom plate 10 in the usual way such pins normally are mounted in the bottom plate of a die set.

While a preferred embodiment has been disclosed, it is evident that the bore 24 could be lined with bonding material that is then coated with the layer of ceramic and which latter is subsequently coated with sprayed metal. The bore could then be reamed and the pin 13 pressed thereinto.

From the foregoing it is evident that a die set has been provided having guide pins that are insulated from the bottom plate and which are held by a press fit in bores within the bottom plate. Furthermore, it is evident that the metal sleeve surrounding the ceramic insulating layer maintains the insulation intact during the pressing of the pin into the bore within the bottom plate.

Although the principles of the invention have been shown and described in detail to fully disclose one embodiment of the invention, it will be evident that changes may be made in such details and certain features may be used without others without departing from the principles of the invention.

What is claimed is:

1. The method of making a die set having male and female mating elements joined by a press fit which comprises providing a layer of bonding material on a surface of one of said mating elements; spraying a ceramic oxide onto said bonding material so as to provide an integral ceramic coating on the surface of one of said mating elements; applying a coating of metal on top of said ceramic coating; machining said last mentioned metal coating to a precise dimension; and pressing said mating elements together.

2. The method of preparing a metallic pin to provide an insulated press fit between it and the bore in a metal supporting member which comprises coating the periphery of a portion of the pin with a bonding material; applying a coating of a ceramic oxide to said bonding material of a thickness sufficient to provide the desired insulating characteristics; applying a coating of a metal to said ceramic oxide; and machining said metal coating to a precise dimension commensurate with the bore in which the pin is to be pressed.

3. The method of preparing a metallic pin to provide an insulated press fit between it and the bore in a metal supporting member which comprises spraying a coating of molten metal onto the periphery of a portion of the pin; spraying a coating of molten ceramic oxide onto the coating of metal; spraying another coating of molten metal on top of said ceramic oxide; and machining said last mentioned metal coating to a precise dimension commensurate with the bore in which the pin is to be pressed.

References Cited by the Examiner

UNITED STATES PATENTS

| 855,471 | 6/07 | Mix | 29—155.52 X |
| 2,274,961 | 3/61 | Horger | 29—525 X |
| 3,054,694 | 9/62 | Aves | 117—70 |

FOREIGN PATENTS 656,503 8/51 Great Britain.

GRANVILLE Y. CUSTER, Jr., Primary Examiner.